UNITED STATES PATENT OFFICE.

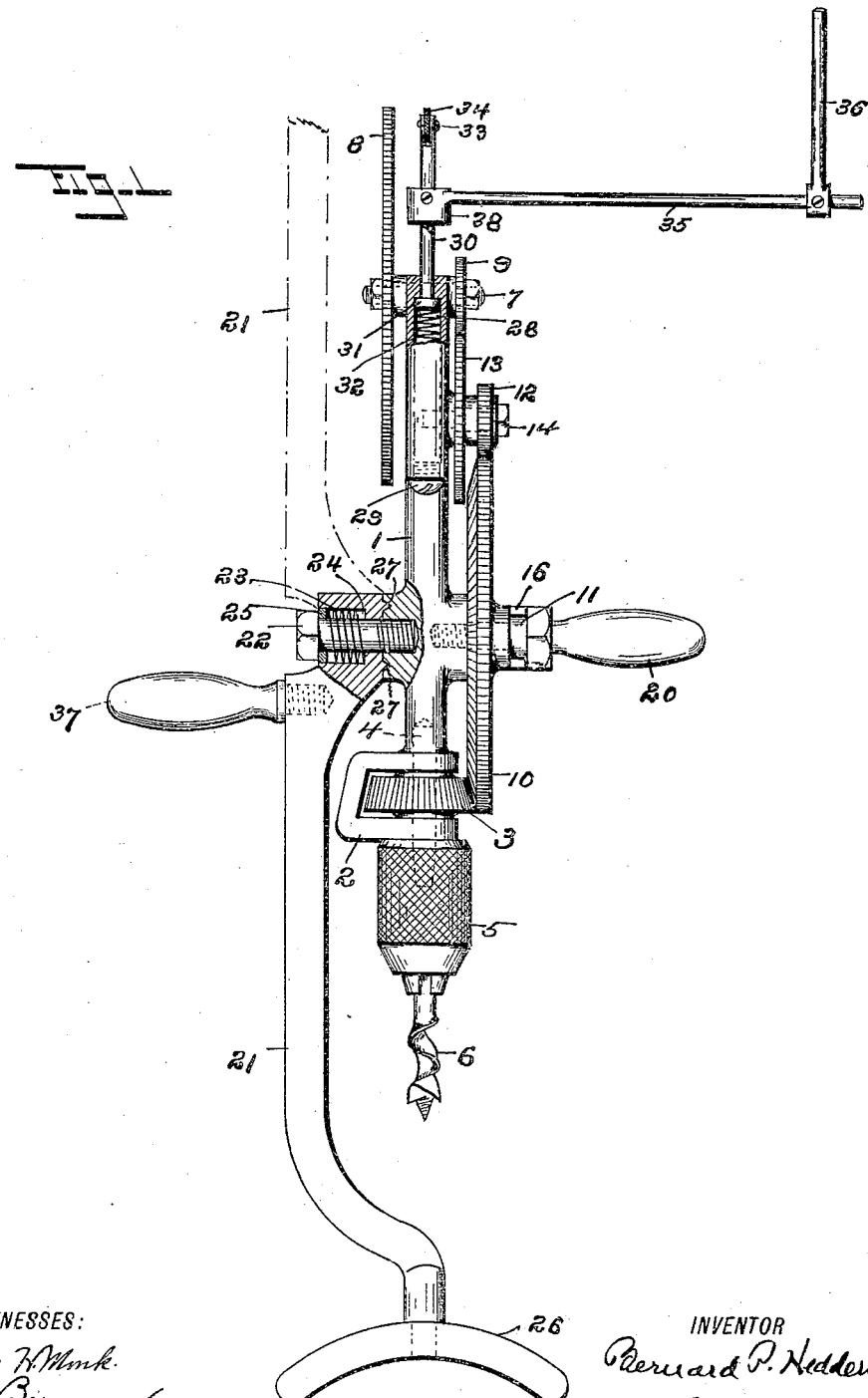

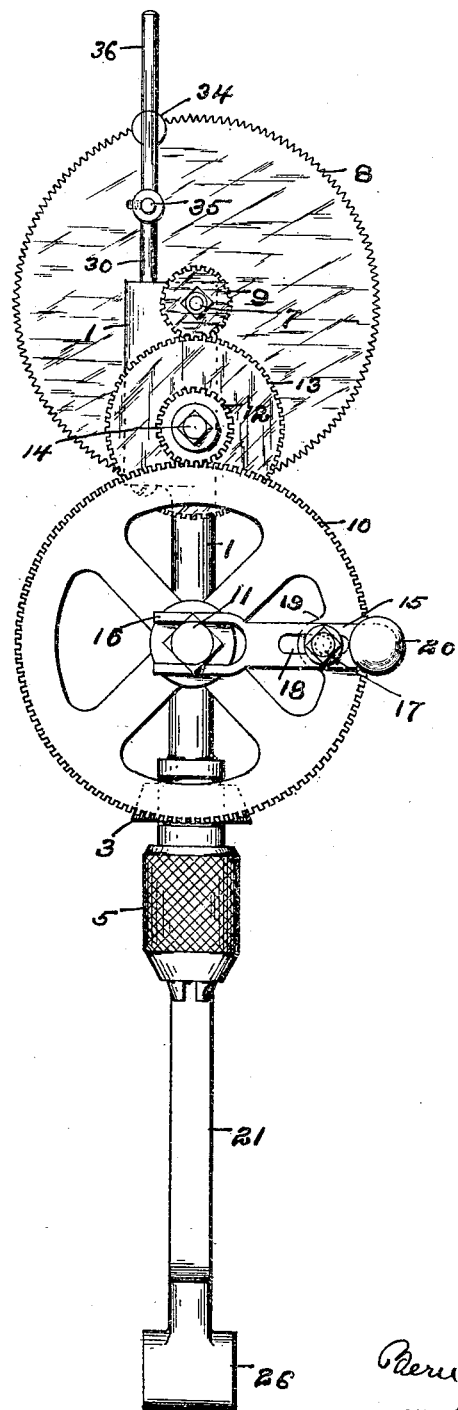

BERNARD P. HEDDERSON, OF NEW HAVEN, CONNECTICUT.

BREAST SAW AND BRACE.

945,720.  Specification of Letters Patent.  Patented Jan. 4, 1910.

Application filed August 5, 1909. Serial No. 511,286.

*To all whom it may concern:*

Be it known that I, BERNARD P. HEDDERSON, a citizen of the United States, residing at New Haven, in the county of New Haven and State of Connecticut, have invented certain new and useful Improvements in Breast Saws and Braces, of which the following is a specification, reference being had therein to the accompanying drawings.

My invention relates to new and useful improvements in a combination saw and brace, and has for its object, among other things, to construct a device of this character of the fewest possible parts, so designed that they may be produced and assembled at the minimum cost.

To these, and other ends, my invention consists in the breast saw and brace having certain details of construction, and combinations of parts, as will be hereinafter described and more particularly pointed out in the claims.

Referring to the drawings, in which like numerals of reference designate like parts in both figures; Figure 1 is a side view of my improved device; and Fig. 2 is a similar view looking from the right of Fig. 1.

In the practice of my invention I provide a body member 1 having an open head 2 at one end within which is rotatably mounted a bevel pinion 3 upon a spindle 4, to the lower end of which is fixed a chuck 5 of any preferred construction, and within which the bit or drill 6 may be held in a well known manner. Rotatably mounted within the other end of the body member 1 is a shaft 7 having a saw 8 fixed thereto upon one side of the body and a pinion 9 upon the opposite side. This shaft is rotated from a combination bevel and spur gear 10 that is mounted upon a stud 11 fixed in the body member 1, with the teeth of the spur gear meshing into those of a pinion 12, which is integral with a gear 13 and rotatable upon a fixed stud 14, the teeth of the gear 13 meshing into those of the gear 9. The gear 10 is rotated manually through a lever 15 having a forked end 16 that straddles the stud 11 and is secured thereto by the stud 17 that passes through a slot 18 and threaded into a lug 19 upon said gear. This connection permitting of a radial adjustment of said lever and to the outer end of which is secured a handle 20. The teeth of the bevel portion of the gear 10 mesh into those of the pinion 3 and impart rotation thereto and to the clutch 5.

An arm 21 having a breast plate 26 fixed to its outer end is pivotally connected with the body member 1 by the bolt 22, which is threaded into said body member and surrounded by a spring 23 which lies within a chamber 24 in said arm, and bears at one end against the bottom of said chamber and at the other end against a disk 25 upon said bolt. That portion of the arm 21 which contacts with the body member 1 is provided with one or more prongs 27 which project into recesses in said body member, as shown in Fig. 1, to prevent rotation of said arm about the bolt 22 when said prongs are in register with said recesses. They do not, however, prevent the rotation of said arm about the bolt 22 when said arm is moved lengthwise upon said bolt against the tension of the spring 23 so as to withdraw said prongs from said recesses, at which time the arm can be rotated to any desired position. The recesses in the body member are preferably arranged so as to hold the arm against accidental rotation when the same is in either of the positions shown by the full and broken lines in Fig. 1.

A pressure foot 30 having a head 31 thereon is movable within the chamber 28 in the body member, and normally held in its outward position by a coil spring 32 that lies within said chamber between the head 31 and the screw 29. Secured to the outer end of the pressure foot 30 by the screw 33 is a roll 34, having a knurled face, that contacts with the surface during the sawing operation. By tightening or loosening the screw 33, the roll 34 will rotate or be held against rotation as desired. Attached to the pressure foot 30 is the combination gage and guide which comprises an adjustable arm 35 having an auxiliary arm 36 shiftable thereon.

In operating with the saw, the handle 37, secured in the arm 21, is grasped in one hand, with the plate 26 against the breast, and the teeth of the saw 8 and the knurled roll 24 against the material to be sawed. The saw is then rotated through the handle 20 and the gear mechanism above described, a slight pressure being exerted upon the plate 26 during the sawing operation, and the pressure foot 30 yielding sufficiently to permit this and at the same time steady the saw. Adjustment of the arm 35 upon the pressure foot 30 provides means whereby the depth of the cut may be predetermined, the face of the hub 38 thereon contacts with the body member and forms a stop. By the use of the auxiliary arm 36 the saw can be caused to move in a path parallel with the edge of the material being operated on. To use the bit or drill instead of the saw, the arm 21 is rotated about the stud 22 and brought to the position shown by broken lines in Fig. 1, and held in exactly the same manner as above described and operated through the same gear mechanism.

My device is especially applicable for use in work that is practically impossible to operate upon with the ordinary saw or brace, and as such, enables work of this character to be done neatly and expeditiously.

There are minor changes and alterations that can be made within my invention, and I would therefore have it understood that I do not limit myself to the exact construction herein shown and described, but claim all that falls fairly within the spirit and scope of my invention.

Having described my invention, what I claim as new and desire to secure by Letters Patent, is:—

1. In a device of the character described, the combination with a body member; of a saw rotatably mounted in one end; a chuck rotatably mounted in the other end with its axis at substantially a right angle to the axis of said saw; and manually actuated gear mechanism for rotating said saw and chuck.

2. In a device of the character described, the combination with a body member; of a frame pivotally connected therewith; a saw rotatably mounted in one end; a chuck mounted in the other end; and manually actuated gear mechanism for rotating said saw and chuck.

3. In a device of the character described, the combination with a body member; of a breast arm pivotally connected to said body member; means for holding said arm against rotation in predetermined positions in relation to said body member; a saw rotatably mounted in said body member at one end; a chuck rotatably mounted in said body member at the other end; and manually actuated gear mechanism for rotating said saw and chuck.

4. In a device of the character described, the combination with a body member; of a breast arm; means for pivotally securing said arm to said body member and permitting lateral movement in relation thereto, said means comprising a stud passing through said breast arm and fixed in said body member; a spring surrounding said stud and exerting a lateral pressure upon said arm; tools carried by said body member upon either side of said stud; and interchanging projections to hold the said breast arm in different positions about the center of said stud.

5. In a device of the character described, the combination with a body member; of a breast arm; means for pivotally securing said breast arm in relation to said body member, said means permitting of a lateral movement of said breast arm in relation to said body member; a saw rotatable on said body member; a chuck also rotatably mounted thereon and manually actuated gear mechanism for rotating said saw and chuck.

6. In a device of the character described, the combination with a body member; of a saw rotatably mounted thereon; with its axis at substantially a right angle to the length of said body member; a chuck rotatably mounted on said body member on the end opposite the said saw, with its axis substantially parallel with the length of said body member; and gear mechanism rotatably mounted on said body member for imparting rotation to said saw and chuck.

In testimony whereof I affix my signature in presence of two witnesses.

BERNARD P. HEDDERSON.

Witnesses:
GEORGE E. HALL,
FLORENCE H. MONK.